Oct. 16, 1928.
J. WERZ
1,688,167
POWER TRANSMISSION
Filed Feb. 6, 1925
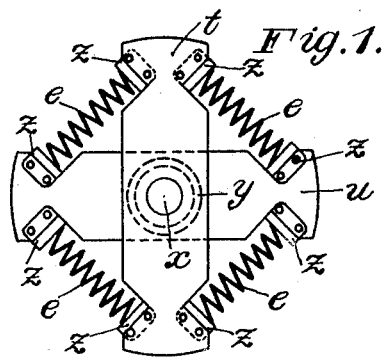
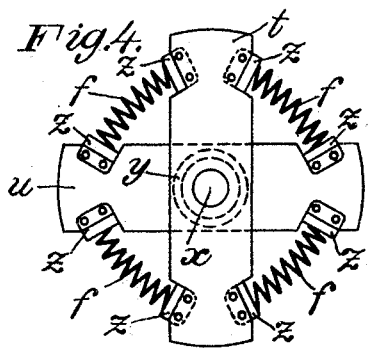
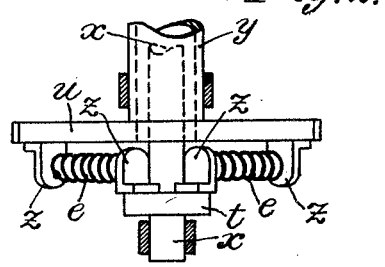
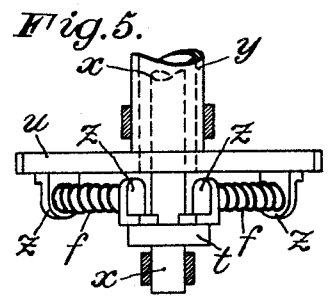
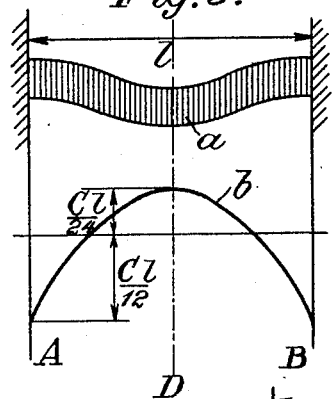
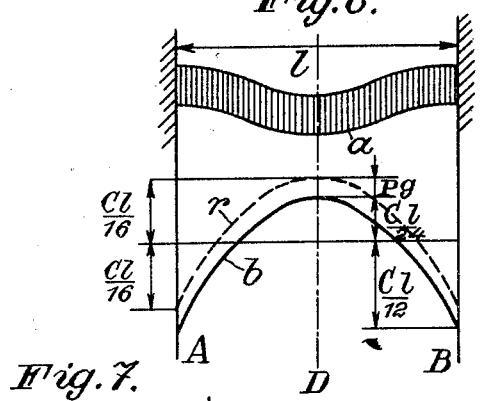
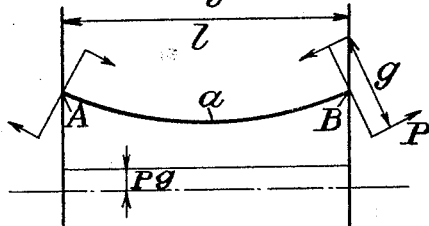
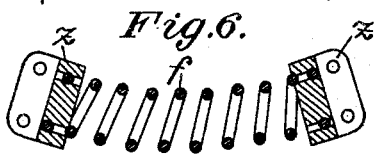

Patented Oct. 16, 1928.

1,688,167

UNITED STATES PATENT OFFICE.

JACOB WERZ, OF GENEVA, SWITZERLAND, ASSIGNOR TO SOCIÉTÉ ANONYME DES ATELIERS DE SÉCHERON, OF GENEVA, SWITZERLAND, A CONFEDERATION OF SWITZERLAND.

POWER TRANSMISSION.

Application filed February 6, 1925. Serial No. 7,203, and in Switzerland February 8, 1924.

This invention comprises a process for transmission of power between rotating parts of machines, and a coupling for carrying out this process.

In view of the restricted space in rotating spring couplings for transmission of power between rotating machine parts, more particularly in the case of couplings built-in to the gear wheels of vehicles, it is desirable to utilize to the fullest possible extent the material of the helical springs employed for the purpose. The following must be pointed out with reference for instance to the known coupling shown in Figures 1 and 2 of the accompanying drawing: Four helical springs $e$ connect together machine parts $t$, $u$ which are secured to spindles $x$ and $y$ mounted in each other. The machine parts $t$ and $u$ are to be considered as driving and driven members of the transmission device, and of course, it is immaterial which one is the driving and which one is the driven member. They are rigidly held by the holders $z$ which, in their turn, are rigidly secured to the machine parts $t$, $u$. When each helical spring $e$ is exposed to the action of centrifugal force owing to the rotation of the machine parts $t$, $u$, its elasticity curve $a$ and the curve $b$ of bending moment have the shapes shown in Figure 3, assuming that centrifugal force acts uniformly throughout the whole length $l$ of the spring.

If C is the centrifugal force uniformly distributed on the whole length of spring, $l$ the length of the spring, the absolute maximum of the bending moment will occur at the fixing points A, B and amount to $\frac{Cl}{12}$ whilst the relative maximum of this bending moment in the centre D of the spring is $\frac{Cl}{24}$. The stress at the fixing points A, B is therefore twice as great as at the centre D of the spring.

In the case of couplings, the axes of which are eccentric, an additional stress is periodically produced at the fixing points at each revolution, so that the ratio between the total stresses at the fixing points A, B and that in the spring centre D, will become still more unfavourable.

According to the present process, as good a utilization of the material of the helical springs as possible is obtained by giving the said helical springs a preliminary tension when erecting them.

The coupling according to the present invention, like other known couplings, has helical springs for power transmission, and holders in which the helical springs are rigidly held and which in their turn are rigidly secured to the machine parts, so that the helical springs can transmit both pressure and tension forces. It differs from the others by its helical springs possessing a preliminary tension when the coupling is in the state of rest.

Figures 4 to 8 of the accompanying drawing illustrate diagrammatically a construction of the coupling. Figures 4 and 5 are respectively an end elevation and a plan of the construction shown. Figure 6 is a detail view. Figures 7 and 8 illustrate the working of this construction.

To the machine parts $t$, $u$ which are to be connected together by the coupling and which are secured to the spindles $x$, $y$ mounted in each other, are rigidly secured, that is to say without any joints, the holders $z$. In the holders $z$ are rigidly held the helical springs $f$ by screwing in, so that they may be used for the transmission of pressure as well as tension forces. These helical springs $f$ have a given preliminary tension and therefore, when the coupling is in the state of rest, have an arc shape (Figures 4, 6 and 7, $a$ in the latter figure indicating the elasticity curve of one helical spring).

The helical springs $f$ wound with a straight axis and rigidly held in their holders $z$ are exposed at their ends A B (Figure 7) to two torques $Pg$ acting in opposite directions. The springs assume therefore a certain curvature which in this case is the arc of a circle, as the bending moment $Pg$ has throughout the whole length $l$ the constant value $Pg$. The springs are inserted in the coupling with their preliminary tension.

When the coupling rotates bending moments produced by centrifugal force appear in the springs $f$. These bending moments are shown by the curve $b$ (Figure 8) and together with the moment of constant preliminary tension which exists throughout the whole length of the springs, produce resulting moments indicated by the curve $r$. The preliminary tension moment which may of course have any desired value, has been assumed here to be of such a size that the moments at the fixing points A, B, and that in the centre D of the springs, become equal, namely $\frac{Cl}{16}$.

The carrying or loading capacity of the springs by the centrifugal force is thereby increased 1.33 times.

This reckoning is made under the assumption that the spring is submitted only to the centrifugal force and to the preliminary tension. With other words: The above mentioned indication is only a right one with reference to the partial amount resulting from the centrifugal force, which amount alone is taken into account.

For the sake of simplicity, the springs are wound in most cases with a straight axis, and the preliminary tension is produced when mounting them in the coupling, by bending, as already stated. The springs may of course be also wound with a curved axis, and such a preliminary tension given to them when inserting them, that their axes form straight lines when built-in. The springs may be also wound with a curved axis, and a preliminary tension given them by bending in the same direction.

The machine parts $t$, $u$ to be connected together may be of course replaced by others.

Claims:

1. In a transmission device, a driving member, a driven member, a plurality of helical springs extending between and connecting the said driving and driven members, the said springs being put under preliminary tension and placed between said driving and driven members to so connect the same that there is a tendency in the springs to bend in a direction transverse to their axes so as to offset the effect of centrifugal force when the transmission device is in motion.

2. In a transmission apparatus, a driving member, a driven member, a plurality of holders rigidly connected to the said driving and driven members, and a plurality of springs extending between and at their ends rigidly fixed in the said holders, the said springs being curved and under sufficient tension when the transmission device is at rest to offset the effect of centrifugal force when the transmission device is in motion.

3. In a transmission apparatus, a driving member, a driven member, a plurality of holders rigidly connected to the said driving and driven members, and a plurality of springs extending between and at their ends rigidly fixed in the said holders, each of the said springs being wound with its axis in a curved line and each spring being further curved when connected in the transmission device so as normally to assume an outwardly curved position and to be under sufficient tension when the transmission device is at rest to offset the effect of centrifugal force when the transmission device is revolving.

4. In a transmission device, a driving member, a driven member, a plurality of holders rigidly connected to the said driving and driven members, and a plurality of springs extending between and at their ends rigidly fixed in the said holders, the said springs being under sufficient tension when the transmission is at rest to offset the effect of centrifugal force when the transmission device is in motion.

In testimony whereof I have affixed my signature.

JACOB WERZ.